Jan. 13, 1959  R. A. FRYKLUND  2,869,109
DEPTH SOUNDING DEVICES
Filed April 24, 1953  3 Sheets-Sheet 1

INVENTOR
ROBERT A. FRYKLUND
BY Elmer J. Gorn
ATTORNEY

Jan. 13, 1959  R. A. FRYKLUND  2,869,109
DEPTH SOUNDING DEVICES
Filed April 24, 1953  3 Sheets-Sheet 2
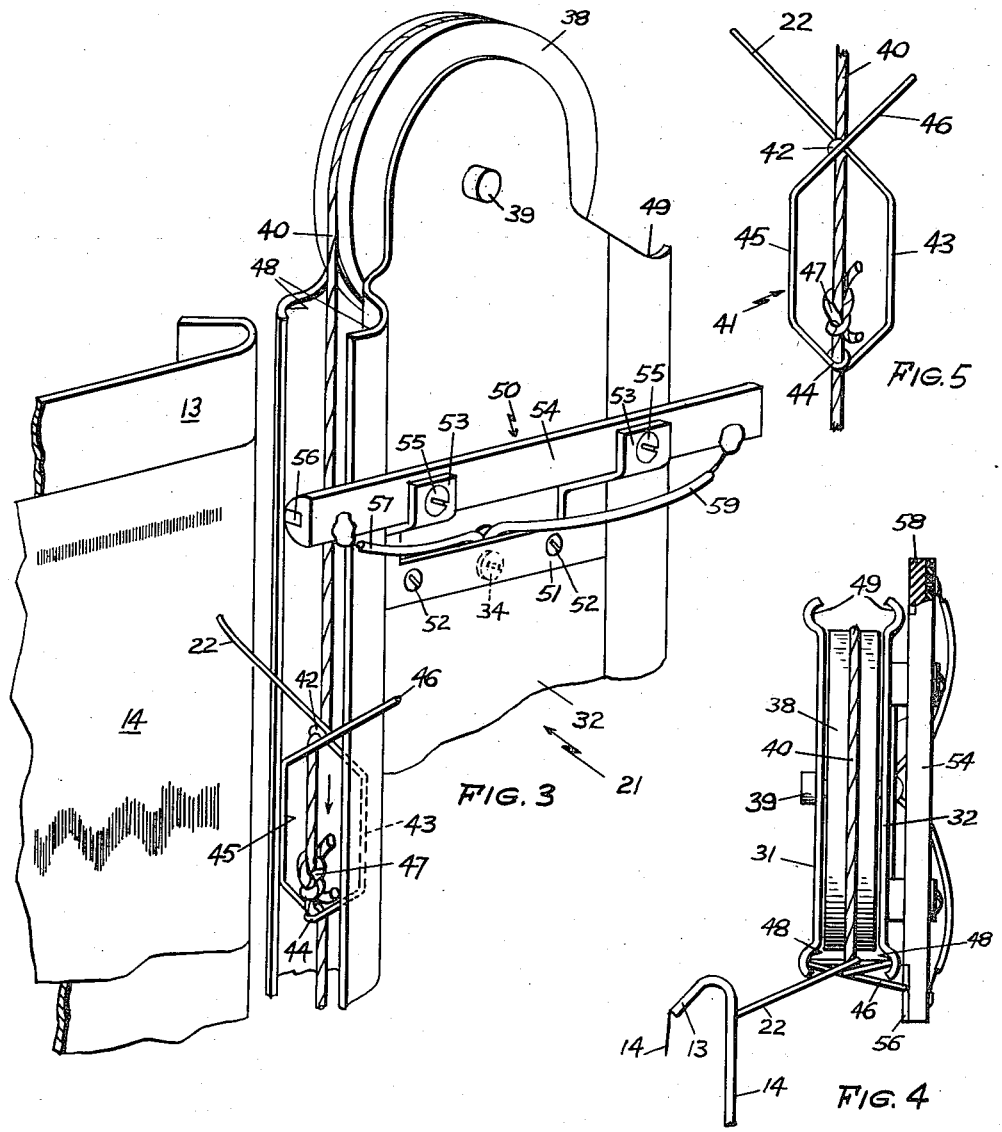
INVENTOR
ROBERT A. FRYKLUND
BY
ATTORNEY Jan. 13, 1959     R. A. FRYKLUND     2,869,109
DEPTH SOUNDING DEVICES
Filed April 24, 1953     3 Sheets-Sheet 3

INVENTOR
ROBERT A. FRYKLUND
BY
ATTORNEY

United States Patent Office 2,869,109
Patented Jan. 13, 1959

2,869,109

DEPTH SOUNDING DEVICES

Robert A. Fryklund, Dedham, Mass., assignor to Raytheon Manufacturing Company, Newton, Mass., a corporation of Delaware Application April 24, 1953, Serial No. 350,788

1 Claim. (Cl. 340—3)

This invention relates to echo-ranging equipment and more particularly to sonic depth measuring equipment utilizing a recording indicator.

Depth sounding systems utilizing recording indicators are well known and consist, generally, of a source of sonic or supersonic oscillations which are switched on periodically and applied to a sonic transducer in contact with the water body whose depth is to be measured. Sonic vibrations transmitted into the water body are directed toward the bottom thereof and produce echo reflections which return to the transducer and are picked up thereby. The echo signals are fed from the transducer through a suitable amplifying system and, if desired, a detecting system to a visual indicator which may be, for example, a rotating light energized by the returning signals or a record medium across which a recording member is drawn with the amplified echo signals being applied to the record medium through the recording member. Many different mechanisms have been devised for drawing the recording member across the record medium. However, such devices have been relatively expensive, and required careful adjustment of the elements to insure successful operation. This invention discloses a recording indicator for use in depth sounders wherein the mechanism for drawing the recording member across the record medium is relatively inexpensive and will operate for long periods of time without careful adjustment of the parts. Briefly, this is accomplished by making the recording member or stylus of a wire bent in a polygonal shape with the ends of the wire extending out from said shape. One of the ends of the wire acts as a stylus and the other end of the wire acts as a keying contact for periodically energizing the source of oscillations. The stylus wire is guided across the paper along the desired path by means of a stationary guide comprising a pair of substantially parallel grooves which are resiliently engaged by a pair of opposite sides of the polygonal shape of the wire. The resiliency of the wire is utilized to urge the sides of the polygonal shape into the grooves in the stationary guide member. The stylus assembly is urged along the path by means of a flexible member comprising a string passing through loops in the wire with the ends of the string being knotted together intermediate the loops such that the knot, which is larger than either of the loops, is urged against one of the loops, thereby drawing the stylus assembly along the guide means in response to movement of the string about a pair of spaced pulley wheels. The stationary guide means are insulated from the support for the record medium and are conductive. Thus a signal may be applied to the stylus by applying the signal to the stationary guide means which transmit the signal to the stylus as it slides along the grooves in the guide means.

This invention further discloses a particular circuit found to be desirable with recording depth sounder indicators. Briefly, the circuit comprises a vacuum tube oscillator, which is keyed by connecting the grid of the vacuum tube through the stylus assembly to the output of the receiver amplifier detector, which has a positive average voltage, through a suitable impedance. As a result, when the oscillator is initially keyed, part of the output signal of the oscillator feeds back through the receiver amplifier detector, thereby driving the oscillator grid more positive to produce a regenerative keying effect.

This invention further discloses a particular support structure for the indicator wherein the main body of the indicator is pivoted in its case such that it may be tilted forward to a predetermined degree and held thereby a latch, thereby allowing easy access to the storage roll of the record medium, thus facilitating its removal and replacement.

Other and further objects and advantages of this invention will be apparent as the description thereof progresses, reference being had to the accompanying drawings wherein:

Fig. 3 is a perspective view of a detail of the mechanism illustrated in Figs. 1 and 2 disclosing more clearly the stylus and guide structure therefor;

Fig. 4 illustrates an enlarged top plan view of the stylus and guide means of the mechanism illustrated in Figs. 1 and 2;

Fig. 5 is an enlarged detailed view of the stylus illustrated in Figs. 1 through 4;

Figure 1:
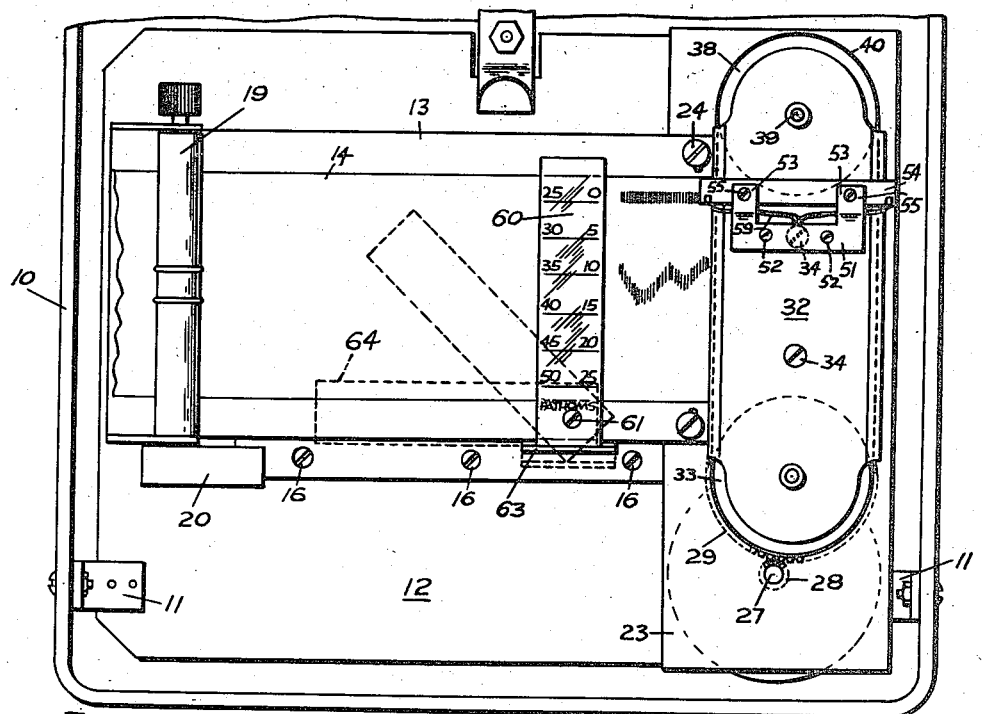
Fig. 1 illustrates a front elevation view of a recording indicator for depth sounders with the cover removed and embodying this invention.
Figure 2:
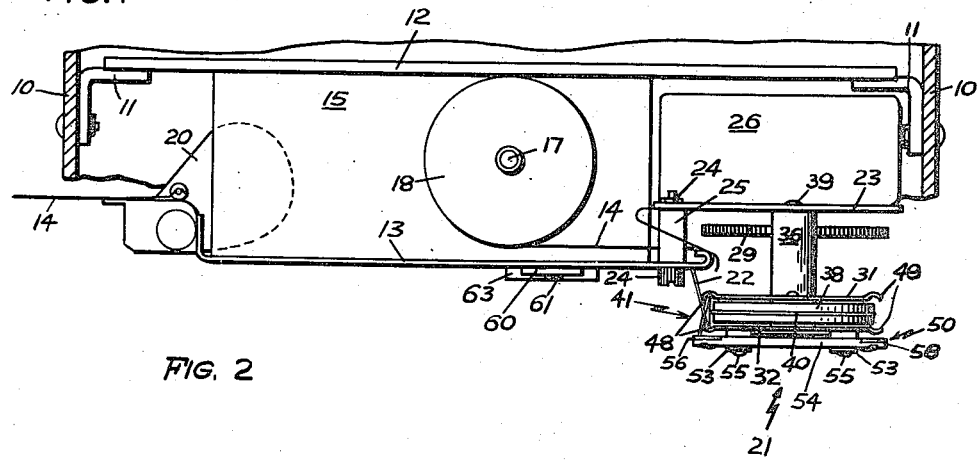
Fig. 2 illustrates a top plan view of the mechanism of the recording mechanism of the indicator illustrated in Fig. 1.

Referring now to Figs. 1 through 6, there is shown a case member 10, which is in the form of a hollow rectangular box-like member, made, for example, of metal. The case 10 has a cover (not shown) with a window therein to permit visibility of the record medium. In its normal position, the indicator may be mounted upright such that the front cover, with its window, would be vertical. Pivotally attached to case 10 near its lower edge by means of pivots 11 is a main chassis member 12 comprising a vertical metal plate. The rear surface of said plate serves as a mounting surface for the various electrical components of the recording indicator, such as resistors, capacitors, tubes, transformers, etc., details of said components not being illustrated herein in the interest of clarity. Positioned in front of chassis 12 substantially adjacent the front edge of the case 10 is a vertical metallic platen 13, which serves as a base member over which the record medium, which, as illustrated herein, is sensitized paper 14, may be drawn. Platen 13 is attached to chassis 12 by means of a support plate 15, which may be formed by bending back the lower edge of platen 13, said member 15 engaging chassis member 12 somewhat below the middle thereof and being rigidly attached thereto, for example, by bolts 16. Member 15 also has attached thereto a paper storage spindle 17 which holds a roll 18 of the sensitized paper 14. The paper 14 leaves the roll 18 and passes around the right-hand edge of the platen 13 which has been rolled over to produce a smooth curve around which the paper passes. The paper passes across platen 13 and under a drive roller 19 driven by a small geared motor 20, such as a synchronous clock motor. The platen and paper storage roll, as well as the drive mechanism therefor, are of a well-known type previously utilized in depth sounder indicators. The motor 20 draws the paper across the platen at a relatively slow rate, for example, a few feet an hour, such that a fresh portion of paper is continuously exposed at the right-hand edge of the platen 13.

Positioned adjacent the right-hand edge of platen 13 is a mechanism 21 for drawing a stylus 22 downwardly across the newly exposed portion of the paper. Mechanism 21 is mounted on a support plate 23 spaced behind platen 13 and substantially to the right thereof. Plate 23 is attached to platen 13 by means of bolts 24 adjacent the upper and lower edges of platen 13, which extend through cylindrical spacers 25 between plate 23 and platen 13. Plate 23 is of substantially the same height as the main chassis 12 and carries at its lower end a motor 26, which is rigidly secured to plate 23, and which is positioned behind plate 23 with the shaft 27 thereof extending forward through an opening in plate 23.

Attached to the end of motor shaft 27 is a pinion gear 28 which engages a spur gear 29 positioned substantially above pinion gear 28. Spur gear 29 is rigidly attached to a shaft 30, whose inner end rotates in plate 23 and whose outer end extends through a pair of spaced parallel metal substantially planar inner and outer members 31 and 32, respectively, and which is rigidly attached to a frictional drive pulley 33 positioned between members 31 and 32. Screws 34 extend from outer plate 32 through metallic spacers 35 positioned between and engaging members 31 and 32 and threadedly engage insulating spacers 36 positioned between inner member 31 and support plate 23. Insulating spacers 36 are attached to plate 23 by means of screws 37.

Members 31 and 32 extend upwardly to a point somewhat above the upper edge of platen 13 and support an upper pulley 38 similar to lower pulley 33 on a shaft 39 extending between members 31 and 32. The axes of pulleys 33 and 38 are oriented substantially perpendicular to platen 13. Pulleys 33 and 38 contain grooves in their peripheries and are adapted to hold a string 40, or other flexible member, extending around both pulleys such that, when the bottom pulley is driven by means of the gears from the motor 26, a point on the string will move vertically downward adjacent the front of the platen 13 around the lower pulley, back up along a path in front of, and considerably to the right of, the platen 13 and around the upper pulley 38 to its starting point.

Attached to string 40 is a stylus assembly 41 consisting of a piece of wire bent in a polygonal shape with the ends of the wire extending out from the polygonal shape. One end of the wire comprises the stylus 22, which is drawn across the paper on platen 13. From stylus 22, the wire loops around the string 40, as at 42, bends in an obtuse angle and extends vertically downward on the opposite side of the string 40 from the stylus 22 to form a first guide engaging portion 43. At the lower end of portion 43, the wire makes another obtuse angle bend and loops around the string 40, as at 44. The wire then extends outwardly on the same side of string 40 as stylus 22 and makes an obtuse angle bend upward to form a substantially vertically extending guide engaging portion 45. At the upper end of guide engaging portion 45, the wire makes another obtuse angle bend and crosses the string 40 substantially at loop 42 to form the other extending end of the wire, which may be used as a keying contact 46. The ends of the string 40 are tied together intermediate loops 42 and 44 to form a knot 47, which is larger than the holes in either loops 42 or 44. As a result, movement of the string, by means of the pulleys 29 and 38, causes the stylus assembly 41 to be drawn down past the platen 13 with the stylus 22 engaging the paper 14 on platen 13.

In order to guide the stylus assembly 41 down past the paper 14 in the desired orientation with respect thereto, the edges of the members 31 and 32 adjacent the platen 13 are formed into opposing vertical trough-like shapes or grooves 48; that is, the edge of each of the members 31 and 32 is first bent outwardly away from the other member and then curved around back toward the other member terminating approximately in the same general plane as the remainder of the main portion of the member. The width of the members 31 and 32 is such that the troughs 48 lie along the same general path as that followed by the string between the pulleys 33 and 38. The distance between the bottoms of the trough-like portions 48 is made somewhat less than the distance between the guide portions 43 and 45 of the stylus assembly 41. Thus, as the stylus assembly is drawn downward from the upper pulley 38, the guide members 43 and 45 enter the trough-like guide members 48 and resiliently engage said members due to the spring action of the wire stylus assembly 41.

The stylus portion 22 of the assembly 41 rests on the edge of the guide portion 48 attached to member 31, while the keying portion 46 of the stylus assembly rests on the edge of the guide trough 48 attached to member 32. Due to the fact that the stylus assembly comprising elements 22 and 42 through 46 are formed to all lie in substantially the same plane, members 22 and 46 are resiliently urged against the edges of the troughs 48 by the spring action of the stylus assembly 41. The trough portions 48 terminate slightly above and below the axes of lower and upper pulleys 33 and 38, respectively, and the ends of the troughs are suitably contoured to allow easy entrance of the stylus assembly 41 into the trough portions.

The pulleys 33 and 38 have a suitable width such that the stylus assembly contacts the pulleys during the periods when it is moved around them so that the stylus assembly is presented to the entry of the troughs in the correct position to allow the guide portions 43 and 45 of the stylus assembly to easily enter the guide troughs. A similar set of troughs 49 is positioned on the opposite edges of the members 31 and 32 from the troughs 48 to guide the stylus assembly 41 back up from the lower pulley 33 to the upper pulley 38 in the correct orientation such that the stylus assembly 41 will lie flat on the pulley 38 as it rotates around the periphery thereof and be in the correct orientation for correct entry to the troughs 48. In order for the members 22 and 46 to resiliently engage the paper 14 and keying contacts, respectively, the stylus assembly 41 is moved such that loop 44 is ahead and loop 42 behind.

A stationary keying contact assembly 50 is supported on member 32 adjacent the upper edge of paper 14. Keying assembly 50 comprises a metal support bracket 51 attached to member 32 by screws 52 and having portions 53 thereof which are bent forward from member 32 and to which is screwed a bar 54 of insulating material by means of screws 55. Bar 54 is spaced somewhat from the trough portions 48 and 49 of member 32 and extends out beyond the edges of said trough portions. Bar 54 carries a metallic contact 56 embedded in the end thereof adjacent paper 14 with a portion of contact 56 being exposed along the rear edge of bar 54. As the stylus assembly 41 is drawn downwardly along the trough portions 48, the keying contact portion 46 of the stylus assembly contacts the stationary contact 56 embedded in bar 54. Contact 56 may be held in bar 54 by means of a stud extending through bar 54 from the contact 56 to the front side of bar 54 to which may be soldered a lead wire, as at 57. The contact 56 is positioned such that stylus keying element 46 strikes contact 56 at substantially the same time as stylus 22 passes a predetermined zero position adjacent the top edge of paper 14. The exact position of impingement of the keying element on contact 56 with respect to the upper edge of paper 14 may be adjusted by making the hole in platen 13, through which the bolts 24 pass, vertically slotted, thus allowing adjustment of the entire motor drive stylus guide assembly vertically. If desired, the system may be keyed prior to impingement of the stylus 22 at the top of the paper 14 by means of a second stationary keying contact 58 similar to contact 56, but positioned at the other end of bar 54 such that the member 46 strikes keying contact 58 as it moves upwardly along trough 49. The desired keying position may be selected by means of a switch which connects either the lead 57 connected to the keying contact 56 or a lead 59 connected to the keying contact 58 to the keying circuit of the depth sounder system.

If desired, a depth scale 60 may be used comprising a transparent member positioned in front of paper 14 and on which are inscribed depth markings. As disclosed herein, the member 60 is in the form of a relatively narrow planar member of a height slightly greater than the height of paper 14 and pivoted about a screw 61 attached to platen 13 below paper 14. The lower end of member 60 is flat and engages a flat spring member 63 bearing upwardly against it. This holds the member 60 normally in upright position. However, if it is desired to swing the member 60 down out of the view of the operator, the member 60 may be rotated counter-clockwise pivoting about the screw 61 and pushing spring member 63 downward until member 60 lies in a horizontal position, as shown at 64, at which time member 63 again moves upwardly engaging the lower side of member 60 and securely holding it in this position. As shown here, the depth markings on the right side of scale 60 correspond to depths of 0 to 25 fathoms which are measured by keying the system with contact 56, while the markings on the left side of the scale correspond to depths of 25 to 50 fathoms which are measured by keying the system with contact 58.

Figure 7:
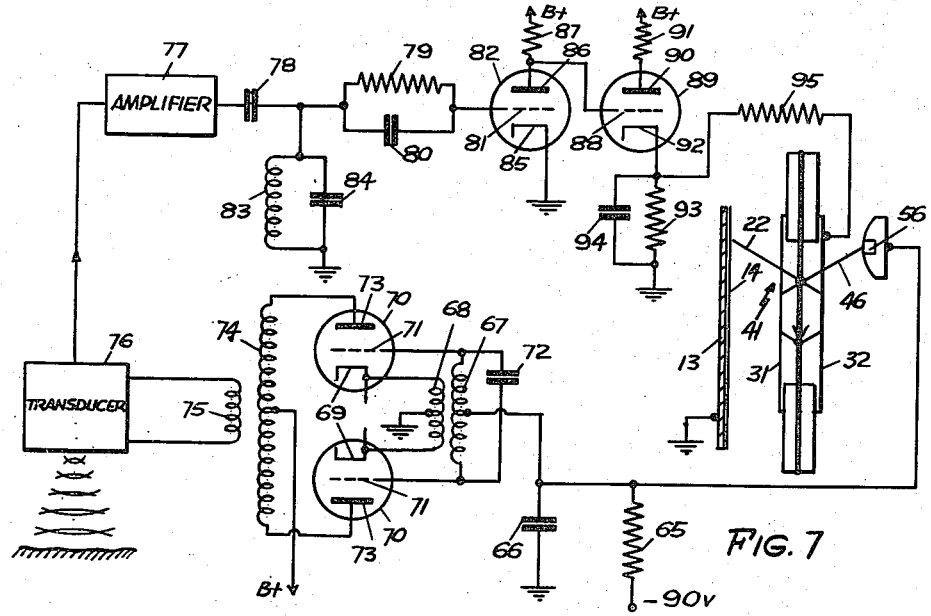
Fig. 7 illustrates a schematic diagram for a depth sounding system utilizing this invention.
Figure 6:
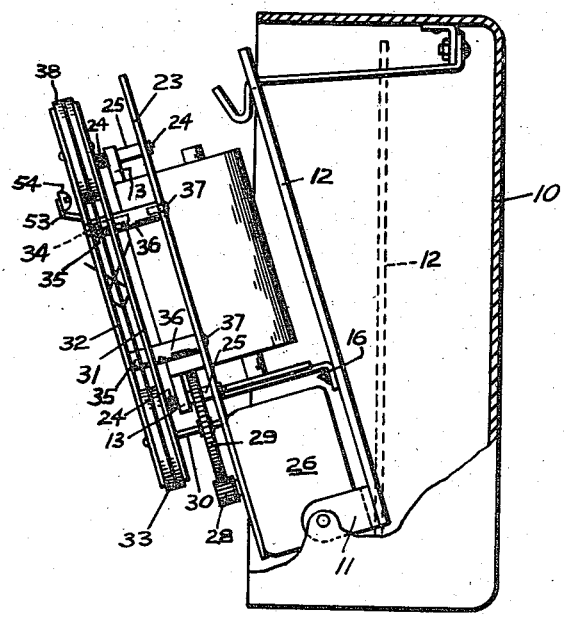
Fig. 6 illustrates a side elevation view of the mechanism illustrated in Figs. 1 through 4 with the case partially broken away to illustrate the pivotal support structure for the recording mechanism.

Referring now to Fig. 7, there is shown a circuit diagram in which the indicator system illustrated in Figs. 1 through 6 may be used. The platen 13 is connected to ground. The keying contact 56 is connected to a source of negative voltage, for example, ninety volts through a resistor 65 and to ground through RF bypass condenser 66. Contact 56 is also connected to a center tap on the secondary winding 67 of a transformer whose primary winding 68 has its center tap grounded. The ends of winding 68 are connected, respectively, to the cathodes 69 of a pair of triodes 70 whose grids 71 are connected, respectively, to the ends of transformer secondary winding 67. The relative polarity of windings 67 and 68 is such that the feed-back between the cathode and grid of each of the tubes 70 is regenerative. Winding 67 has a condenser 72 in parallel therewith which resonates said winding at the desired oscillation frequency of the system, which may be, for example, in the supersonic range. The plates 73 of triode 70 are connected, respectively, to the ends of the primary winding 74 of an output transformer, winding 74 having a center tap which is connected to B+.

Tubes 70 are normally non-oscillatory due to the high negative bias applied to the grids 71 through the resistor 65 and the transformer winding 67. However, when the stylus assembly 41 is drawn downwardly, the portion 46 thereof contacts keying contact 56 applying a positive-going voltage to grids 71 from a positive source, to be described presently, and causes tube 70 to oscillate at the resonant frequency of winding 67 and condenser 72 for the duration of the period that contacts 46 and 56 touch. The bursts of oscillations are coupled from winding 74 to a secondary winding 75 of the output transformer which feeds the energy to a transducer 76 which transforms the electrical oscillations into sonic vibrations and transmits them downwardly through the water body whose depth is to be measured. Returning echo vibrations are picked up by the transducer 76 and fed to the input of an amplifier 77, which may be of any desired type.

The output of amplifier 77 is fed through a coupling condenser 78 and a grid-leak circuit comprising a grid-leak resistor 79 and condenser 80 in parallel to the grid 81 of a triode 82. The junction between condenser 78 and the grid-leak circuit is connected to ground through a tank circuit comprising an inductance 83 and condenser 84 in parallel, said tank circuit being adjusted to resonate at the oscillation frequency of the triodes 70. The cathode 85 of triode 82 is connected to ground and the anode 86 thereof is connected to B+ through a plate load resistor 87 and to the grid 88 of a triode 89. The anode 90 of triode 89 is connected to B+ through a current limiting resistor 91 and the cathode 92 thereof is connected to ground through a cathode load resistor 93 bypassed by an RF condenser 94 which substantially bypasses the oscillation frequency of the system while allowing modulation components, namely, the envelope of the transmitted and echo signals, to appear across resistor 93. Cathode 92 is also connected through a current limiting resistor 95 to members 31 and 32 through which a signal is fed from cathode 92 to the stylus assembly 41. Thus, as the stylus portion 22 of assembly 41 is drawn down across the paper 14, the returning echo signals cause marks to appear thereon indicative of the distance of the bottom of the water body or objects in the water body from the depth sounding system.

Since cathode 92 is normally positive, for example, on the order of fifty or sixty volts, this voltage would be applied through stylus keying contact 46 to the stationary contact 56 when they are in contact, thereby applying a predetermined portion of the voltage on cathode 92 to the grids 71 of the oscillator tube 70 and causing said tubes to burst into oscillations. The portion of the voltage on cathode 92 which is applied to the grid 71 is determined by the relative resistances of the resistors 65 and 95. Indeed, if it is desired to apply the entire voltage to the grid 71, the resistor 95 may be eliminated. However, it has been found advisable to make the resistance of resistor 95 relatively high to avoid burning at the contacts 46 and 56.

After the oscillators 70 have initially started to oscillate following closure of contacts 46 and 56, a portion of the output oscillations is coupled back from transducer 76 through the amplifier 77 and the grid-leak detector circuit to cathode 92 driving it even farther positive and thereby producing a regenerative keying effect. This allows the oscillators 70 to be sharply and reliably keyed without addition of an additional keying tube, such as a thyratron. Once the oscillations have built up to a high value, the signal, as applied to the stylus assembly 41, burns a zero mark through the paper 14 thus holding the grid 71 substantially at zero potential due to contact of the stylus assembly 22 with the platen 13 for the duration of the keying cycle.

This completes the description of the particular embodiment of the invention illustrated herein. However, many modifications thereof will be apparent to persons skilled in the art without departing from the spirit and scope of the invention. For example, the indicator system illustrated in Figs. 1 through 6 may be used in any desired keying circuit, such as a thyratron keying circuit, and the amplifier and detector circuit may be any of the well-known circuits used for these purposes. The particular stylus assembly may have many different shapes and the guide assembly may be varied utilizing, for example, V-shaped troughs rather than the semi-circular type illustrated. Accordingly, it is desired that this invention be not limited by the particular details illustrated herein, except as defined by the appended claim.

What is claimed is:

An indicator comprising a record medium, a recording member comprising a stylus assembly having a first portion adapted to be drawn across said medium for recording purposes and a second portion electrically connected to the first portion used as a keying contact, an oscillator keyed by said keying contact, a transducer connected to the output of said oscillator, and a detector connected to the output of said transducer and having its output connected to said stylus assembly, said oscillator, detector and keying contacts forming a regenerative loop for intensifying said keying action of said keying contacts.

References Cited in the file of this patent

UNITED STATES PATENTS

| | | |
|---|---|---|
| 1,452,122 | McConnel | Apr. 17, 1923 |
| 2,278,919 | Erickson et al. | Apr. 7, 1942 |
| 2,491,020 | Winchel | Dec. 13, 1949 |
| 2,496,980 | Blumlein | Feb. 7, 1950 |
| 2,528,015 | Parsegian et al. | Oct. 31, 1950 |
| 2,557,196 | Nelson | June 19, 1951 |
| 2,572,546 | Walton | Oct. 23, 1951 |
| 2,597,199 | Stamper | May 20, 1952 |
| 2,610,244 | Wolf | Sept. 9, 1952 |
| 2,614,903 | Stamper et al. | Oct. 21, 1952 |
| 2,633,405 | Nelson | Mar. 31, 1953 |
| 2,649,546 | Varela | Aug. 18, 1953 |
| 2,697,172 | Szerlip | Dec. 14, 1954 |